United States Patent
Schmid et al.

Patent Number: 5,408,395
Date of Patent: Apr. 18, 1995

[54] ILLUMINATION DEVICE

[75] Inventors: Heinrich Schmid, Neurtingen; Margret Schmock Von Ohr, Reutlingen, both of Germany

[73] Assignee: Robert Bosch GmbH, Stuttgart, Germany

[21] Appl. No.: 136,685

[22] Filed: Oct. 14, 1993

[30] Foreign Application Priority Data

Dec. 19, 1992 [DE] Germany ............ 42 43 175.1

[51] Int. Cl.⁶ ............ F21Q 1/00; F21V 23/00; B60Q 1/26
[52] U.S. Cl. ................ 362/240; 362/249; 362/337; 362/800
[58] Field of Search ........ 362/800, 226, 240, 249, 362/246, 337, 331, 61, 80.1, 83.3; 439/110, 857, 682, 617

[56] References Cited

U.S. PATENT DOCUMENTS

| | | | |
|---|---|---|---|
| 4,733,335 | 3/1988 | Serizawa et al. | 362/800 |
| 4,831,503 | 5/1989 | DeSantis et al. | 362/240 |
| 4,851,810 | 7/1989 | Vitale et al. | 362/240 |
| 4,935,665 | 6/1990 | Murata | 362/800 |
| 4,951,179 | 8/1990 | Machida | 362/800 |
| 5,062,027 | 10/1991 | Mochida et al. | 362/800 |
| 5,119,174 | 6/1992 | Chen | 362/800 |
| 5,160,200 | 11/1992 | Cheselske | 362/800 |

FOREIGN PATENT DOCUMENTS 3315785 8/1984 Germany .

*Primary Examiner*—Ira S. Lazarus
*Assistant Examiner*—Sara Sachie Raab
*Attorney, Agent, or Firm*—Michael J. Striker

[57] ABSTRACT

An illumination device, particularly for motor vehicles, has a housing, at least one support part, a plurality of semi-conductor light sources arranged in the support part and provided with electrical connection means for connecting the semi-conductor light sources with a voltage source. The support part has a plurality of separate support members arranged in the housing. Each of the separate support members carries only some of the semi-conductor light sources and is releasably insertable into the housing independently of other support members.

10 Claims, 2 Drawing Sheets

ILLUMINATION DEVICE

BACKGROUND OF THE INVENTION

The present invention relates to an illumination device.

More particularly, it relates to an illumination device, particularly for motor vehicles, which has at least one support part for supporting several semi-conductor light sources and their electrical conductors, and is provided with connector elements for connecting the conductors with a voltage source.

Illumination devices of the above-mentioned general type are known in the art. One such illumination devices is disclosed, for example, in the German document DE 33 15 785. The support part of this illumination device supports all semi-conductor light sources provided for the illumination device and formed as three-phase light diodes. The support part includes a metallic base plate in which the reflectors are formed and provided with semi-conductor light sources, and a coating composed of transparent plastic and applied on the side of the base plate on which the semi-conductor light sources are arranged. Further lines are arranged in the support part for electrical connection of the semi-conductor light sources with one another and with a voltage source. Connection lines for connecting the semi-conductor light sources with a voltage source extend from the support part. The illumination device also has a light disk provided with optical elements for influencing the light emitted by the semi-conductor light sources.

The above-described illumination device has the disadvantage that in the event of a failure of only one semi-conductor light source, the support part which contains all semi-conductor light sources must be exchanged. The support part has a large surface in view of the great number of the semi-conductor light sources. Therefore, its manufacture is quite difficult and in operation of the light, breaks of the electrical connection to the semi-conductor light sources which result from different thermal deformations, can lead to a failure of individual semi-conductor light sources. Also, for illumination devices with different dimensions, a support part adapted to them is required, which of course must be avoided for an efficient manufacture. The disadvantage of this illumination device is also that the connection of the connecting elements extending from the support part is complicated during mounting and dismounting of the support part.

SUMMARY OF THE INVENTION

Accordingly, it is an object of the present invention to provide an illumination device which avoids the disadvantages of the prior art.

In keeping with these objects and with others which will become apparent hereinafter, one feature of the present invention resides, briefly stated, in an illumination device of the above-mentioned type, in which in accordance with the present invention, several separate support parts are arranged in a housing and provided each only with a part of all semi-conductor light sources provided for the illumination device so that they are releasably inserted in the housing independently of one another.

When the illumination device is designed in accordance with the present invention, it has the advantage that due to the assembly of a part of all semi-conductor light sources provided for the illumination device in one support part, in the arrangement of several such support parts, in the event of a failure of individual semi-conductor light sources, only that support part must be exchanged which supports the failed semi-conductor sources.

Several semi-conductor light sources, for example, 4-6 pieces, can be assembled in one support part, which is also favorable for the manufacture and thermal deformation than a large support part containing all semi-conductor light sources. The number of the support parts arranged in the illumination device depends on the illumination intensity required for it. By the assembly of several support parts in one illumination device which can be arranged differently, it is also possible to provide illumination devices with different sizes while using the same support parts.

In accordance with another advantageous feature of the present invention, electrical contacts are arranged in the housing, and the connection elements of the support parts come to abutment against the contacts during the insertion of the support parts into the housing. In this construction, the support parts are simply mountable in the housing, and no additional steps must be taken for establishing the electrical connections.

In accordance with another advantageous feature of the present invention, the support parts are held in the device housing through their connection elements extending into the busbar. This construction is advantageous since no additional mounting elements for the support parts are needed.

A simple manufacture and good stability of the support parts are obtained when the semi-conductor light sources and the electrical conductors of each support part are injection molded around them with a joint coating of a transparent plastic mass.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
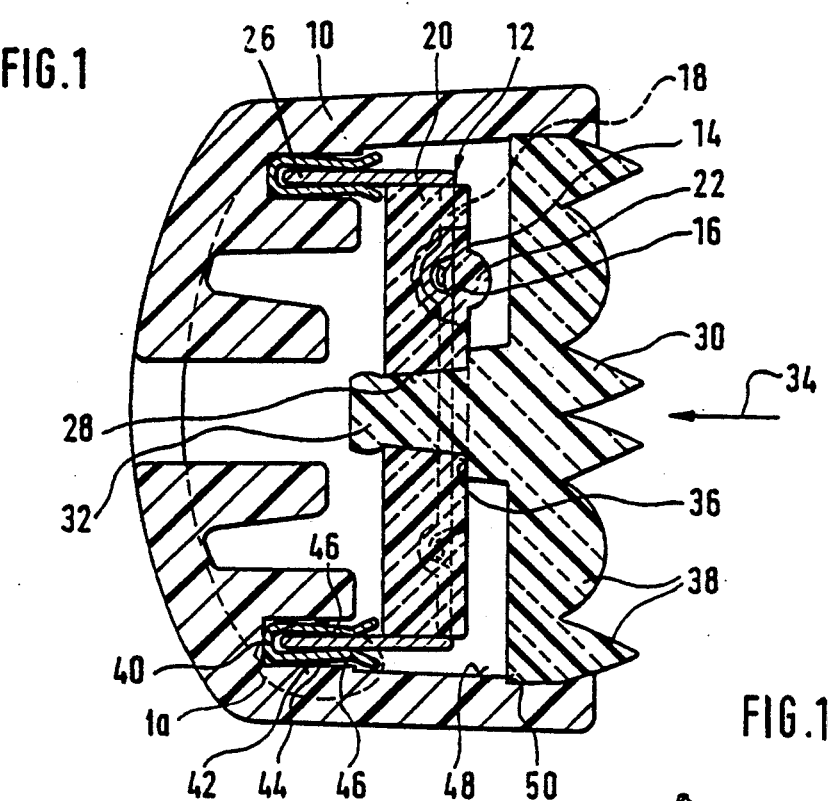
FIG. 1 is a view showing an illumination device with a support part inserted in it, in a longitudinal section.
Figure 2:
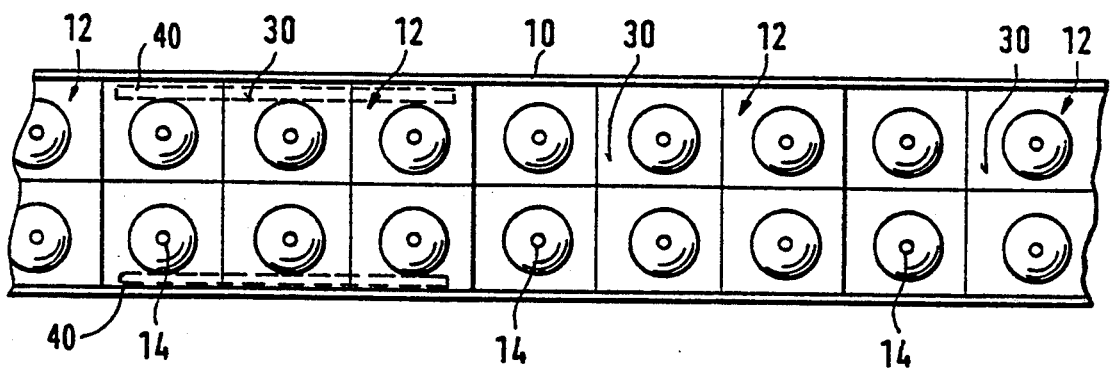
FIG. 2 is a view showing the illumination device of FIG. 1 from a front view.
Figure 3:
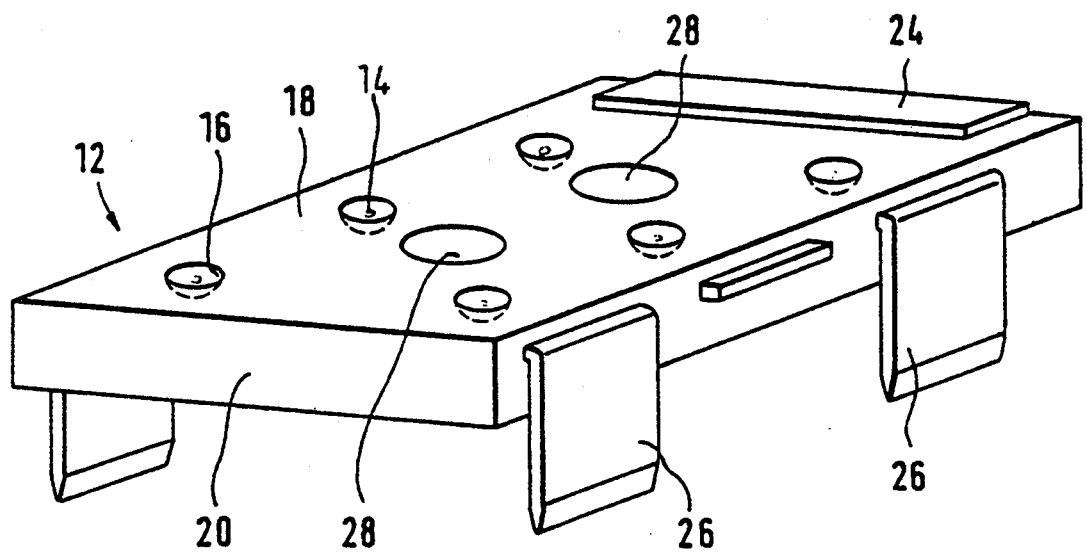
FIG. 3 is a view showing the support parts of the illumination device in perspective.

FIGS. 1 and 2 show an illumination device formed as a light, for example, for motor vehicles, which can be used as brake lights, upper brake lights, blinking lights or other signal lights. The light has a housing 10 composed, for example, of a synthetic plastic material. Several separate support parts 12 are releasably inserted in the housing 10 independently of one another. Each support part 12 has correspondingly several semi-conductor light sources 14, in the shown embodiment, six semi-conductor light sources. The number of the support parts 12 arranged in the light depends on the light-technical requirements which must be fulfilled by the light, in particular on the illumination intensity to be obtained. In the shown embodiment, the support parts 12 are arranged near one another, so that the light has a low height but a great width. The support parts 12 can be arranged in any way, so that they can be assembled to form surfaces of different sizes and shapes. In the shown embodiment, the light is used as an upper additional brake light for a motor vehicle, which is arranged in the upper region of the rear window of the motor vehicle and does not obstruct the sight of the vehicle driver because of its low height.

Reflectors 16 are formed in each support part 12, and the semi-conductor light source 14 is arranged in each reflector. The semi-conductor light sources 14 can be formed, for example, as light diodes or laser diodes. The support part 12 moreover contains metal conductor tracks for the semi-conductor light sources 14. During the manufacture of the support part 12, a thin metal plate is first produced, and then the depressions required for the reflectors 16 are impressed in the plate and parts which are not required for the electrical conductor tracks are punched out from the plate. Therefore, connecting webs remain between the conductor tracks 18, which are needed for the assembly. Subsequently, the depressions are coated with a reflecting material first to produce the reflectors 16. The semi-conductor light sources 14, for example, in the form of so-called light diodes are inserted in the reflectors 16 and connected electrically conductively with one another and with the conductor tracks 18. The unit composed of the conductor tracks 18, the reflectors 16 and the semi-conductor light sources 14 is covered with a coating 20 which serves for its stabilization and insulation and is composed of a transparent synthetic plastic mass, so that a substantially parallelepiped-shaped support part 12 is produced.

The coating 20 can be colorless or can be also provided with a color required for the use of the light. The coating 20 can be provided with optical elements 22 shown in FIG. 1 for influencing the light emitted by the semi-conductor light sources 14. The optical elements can be formed, for example, as lenses, which, depending on the required light radiation characteristics, can have circular, parabolic, elliptic, hyperbolic or any other form in a longitudinal cross-section. Subsequently, during the production of the support part 12, the connecting webs between the conductor tracks are removed, for example, by a laser beam. A resistance conductor track 24 can be arranged on the outer surface of the support part 12 and electrically connected with the semi-conductor light sources 14 and 16 to serve as a pre-resistance for the semi-conductor light sources 14 when the available voltage is too high for the operation of the semi-conductor light sources 14. The resistance conductor track 24 can be also adjusted by a laser beam to the size required for the safe operation of the semi-conductor light sources 14. Connection elements 26 extend from the conductor tracks 18 outwardly from the support part 12 and can be formed as plug stems.

Two openings 28 can be formed, for example, in the support part 12 as receptacles for a light disk 30. The light plate 30 can be colorless or can have a color required for the use of the light. Two legs 32 project from the light plate 30 which is composed of a transparent plastic, toward the support part 12. They extend through the openings 28 in the support part 12. The openings 28 and the legs 32 conically narrow in a mounting direction 34 of the light plate 30. A projection 36 is formed on the legs 32 by a cross-sectional reduction, so that the light plate 30 on the support part 12 comes to abutment against the projection in the end position. In this end position, the end of the legs 32 which extends outwardly beyond the openings 28 are plastically deformed by heating and pressure and compressed, so that the light plate 30 is held on the support part 12. The openings 28 in the support part 12 and the legs 32 on the light plate 30 can be formed with regard to their position and shape so that the light plate 30 with the support part 12 can be connected only in one position and thereby the correct arrangement of the light disk 30 is positively guaranteed.

The light plate 30 is provided with optical elements 38 for influencing, or in other words, deviating and/or dissipating the light emitted by the semi-conductor light sources 14. The optical elements 38 can be formed, for example, as fresnel lenses and provided on the side which faces the support part 12 or on the opposite side of the light plate 30. In addition, the light plate 30 on the side which is opposite to the side of the above-described optical elements 38, can be provided with further optical elements formed as toroidal dissipating elements. These additional elements can have different radii of curvature in different longitudinal sections and thereby can deviate light which extends through them in horizontal and vertical directions to a different extent. The connection of the light plate 30 is performed before the insertion of the support part 12 into the light housing 10, so that these two parts can be inserted in the light housing 10 as a unit.

Figure 1A:
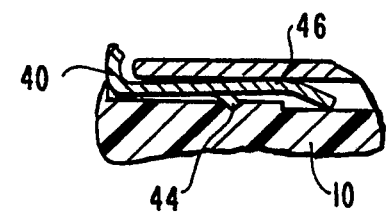
FIG. 1a is a view showing a fragment 1a of FIG. 1 on an enlarged scale.

Contact elements 40 are arranged in the light housing 10 and are connected with a not-shown voltage source. In a motor vehicle, such a voltage source is a vehicle battery. The contact elements 40 in the embodiment shown in FIG. 1 are formed as busbars inserted in groove-shaped depressions 42 in the light housing 10 and are held there, for example, by hooks 44 projected from it as shown also in FIG. 1a. Therefore, two busbars 40 are formed and arranged so that one busbar is arranged in an upper region and another busbar is arranged in a lower region of the light housing 10. The busbars 40 are bent in a U-shaped fashion in the longitudinal section through the light housing 10. Their legs 46 extend to an opening 48 of the light housing 10, through which the support parts 12 are inserted in the latter. The legs 46 are elastically expandable and their end regions directed to the openings 48 are bent outwardly.

The support parts 12 are inserted through the opening 48 into the light housing 10. Their connecting elements 26 extend between the legs 46 which therefore elastically turn away from one another. The insertion of the connection elements 26 between the legs 46 is facilitated by the bent ends. An end position of the support part 12 can be fixed in different ways. For example, the light disk 30 comes to abutment against a projection 50 in the light housing 10. The end position can be also fixed by the abutting of the connection elements 26 against the base of the busbar 40. The support part is held simultaneously in the light housing 10 by the connection elements 26 extending in the busbars 40. Therefore, no additional mounting elements are needed, and it is understood that they can be provided when needed.

It will be understood that each of the elements described above, or two or more together, may also find a useful application in other types of constructions differing from the types described above.

While the invention has been illustrated and described as embodied in an illumination device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An illumination device particularly for motor vehicles, comprising a housing; at least one support part; a plurality of semi-conductor light sources arranged in said support part and provided with electrical connection means for connecting said semi-conductor light sources with a voltage source, said support part having a plurality of separate support members arranged in said housing and provided with a reflector for each of said semi-conductor light sources, said separate support members each carrying only some of said semi-conductor light sources and being releasably insertable into said housing independently of one another.

2. An illumination device as defined in claim 1, wherein said electrical connection means includes an electrical conductor for connecting said semi-conductor light sources and a plurality of connection elements for connecting said electrical conductor with a voltage source.

3. An illumination device as defined in claim 1; and further comprising a plurality of electrical contacts arranged on said housing so that said connection means of said support members come to abutment against said electrical contacts during insertion of said support part in said housing.

4. An illumination device as defined in claim 1; and further comprising a resistance conductor track arranged on each of said support members and operating as pre-resistance for said semi-conductor light sources.

5. An illumination device particularly for motor vehicles, comprising a housing; at least one support part; a plurality of semi-conductor light source arranged in said support part and provided with electrical connection means for connecting said semi-conductor light sources with a voltage source, said support part having a plurality of separate support members arranged in said housing, said separate support members each carrying only some of said semi-conductor light sources and being releasably insertable into said housing independently of one another; and a plurality of electrical contacts arranged on said housing so that said connecting elements of said support members come to abutment against said electrical contacts during insertion of said support part in said housing, said electrical contacts are formed in said housing as busbars having a U-shaped cross-section with legs extending opposite to an insertion direction of said support part and being elastically expandable, sad connection elements extending from said support part and engaging between said legs with an elastic expansion of said legs.

6. An illumination device as defined in claim 4, wherein said support members are held in said housing by said connection elements which engage in said busbars.

7. An illumination device particularly for motor vehicles, comprising a housing; at least one support part; a plurality of semi-conductor light source arranged in said support part and provided with electrical connection means for connecting said semi-conductor light sources with a voltage source, said support part having a plurality of separate support members arranged in said housing, said separate support members each carrying only some of said semi-conductor light sources and being releasably insertable into said housing independently of one another; and a plurality of light plates, each of said support members having a recess for arranging a respective one of said light plates at a side of respective one of said support members for light emitted by said semi-conductor light sources of said support member.

8. An illumination device as defined in claim 7, wherein said light disks have optical elements for influencing the light emitted by said semi-conductor light sources.

9. An illumination device particularly for motor vehicles, comprising a housing; at least one support part; a plurality of semi-conductor light source arranged in said support part and provided with electrical connection means for connecting said semi-conductor light sources with a voltage source, said support part having a plurality of separate support members arranged in said housing, said separate support members each carrying only some of said semi-conductor light sources and being releasably insertable into said housing independently of one another, each of said support members having an electrical conductor for said semi-conductor light sources; and a common coating composed of a transparent synthetic plastic mass and covering both said semi-conductor light sources and said electrical conductor of each of said support members.

10. An illumination device as defined in claim 9, wherein said coating is provided with optical elements for influencing the light emitted by said semi-conductor light sources.

* * * * *